Aug. 5, 1969    M. P. SCHLIENGER    3,459,868
ARC FURNACE WITH ADJUSTABLE ELECTRODE SUSPENSION
Filed June 27, 1967    3 Sheets-Sheet 1

MAX P. SCHLIENGER
INVENTOR.

BY

Townsend and Townsend

MAX P. SCHLIENGER
INVENTOR.

BY

Townsend and Townsend

3,459,868
ARC FURNACE WITH ADJUSTABLE
ELECTRODE SUSPENSION
Max P. Schlienger, 19 Rollingwood Drive,
San Rafael, Calif. 94901
Filed June 27, 1967, Ser. No. 649,266
Int. Cl. H05b 7/10, 7/18
U.S. Cl. 13—14                                                20 Claims

ABSTRACT OF THE DISCLOSURE

An arc furnace having a pair of crucibles and an electrode holder movable from a position aligned with one of the crucibles to a position aligned with the other crucible. The holder has an electrode suspension unit which is adjustable in position to compensate for dimensional irregularities in an electrode suspended thereby. Vacuum means carried by the support evacuates impurities from a crucible during an electrode melting operation and the suspension unit advances the electrode progressively into the crucible as the electrode melts. Attachment means on the suspension unit becomes automatically coupled to an electrode as the suspension unit is moved at a predetermined direction relative to the support. An electrical power lead is releasably coupled to the holder by fastening means which allows shifting of the holder while the power lead remains stationary.

---

The present invention is directed to an improved arc furnace of the type which employs apparatus for suspending a consumable electrode in a crucible capable of being evacuated. This type of furnace operates on the principle that impurities initially in a solid electrode can be made gaseous when an arc is established between the electrode and the crucible, and the gaseous impurities can be evacuated from the crucible and thereby separated from the metal which is to be purified and which is deposited in the crucible after being melted by the arc. Melting under vacuum or inert atmosphere also eliminates pick-up of impurities from the atmosphere.

The electrode suspension system for arc furnace apparatus of this type necessarily must be rugged in construction inasmuch as the electrodes used with the apparatus can be as heavy as 20 to 30 tons. Moreover, extremely high temperatures are required to melt the electrodes so that, following a melting operation, a considerable amount of time is required to allow a crucible to cool before the deposited metal therein can be made available for additional processing.

The present invention provides an improved arc furnace which has a number of features which cooperate to render the furnace highly efficient and relatively simple to operate. One feature of the invention is the way in which electrical power is supplied to the shiftable electrode holder. The holder is rotatively mounted on a support for movement between the two operative positions and a stationary electrical power lead aligned with the axis of rotation of the holder is releasably connected to the latter by a suitable releasable clamp which rotates with the holder. Thus, when the clamp breaks the electrical connection between the holder and the power lead, the holder can rotate to another operative position while the power lead remains in a fixed location. Thereafter, the clamp can again engage the power lead to make the requisite electrical contact. By virtue of this feature the power lead can be permanently mounted and thereby be more effective in carrying the relatively high electrical currents required to establish and maintain the arc.

Another important feature of the invention is the provision of vacuum manifold in the support or pylon on which the electrode holder is rotatably mounted. Thus, the holder will be unimpeded as it rotates from one operative position to another and a filter can be positioned in the pylon for filtering solid particles and condensate removed as impurities from a crucible in which an electrode melting operation occurs. Access means is provided to allow for periodic cleaning of the filter.

Still another feature of the invention is the provision of the electrode attachment means on one end of the holder which automatically connects the holder to an electrode to be suspended thereby. In this way, no manual operations are necessary to interconnect the electrode and the holder other than to assure that the holder is properly aligned with the electrode to be suspended.

An important advantage of the construction of the holder is that it can be adjusted as to position relative to the crucible aligned therewith. This becomes extremely important where the electrode to be suspended is warped or bent so as to provide an irregular shape which could otherwise provide an electrical short circuit between the electrode and the crucible. By virtue of the adjustment means on the holder, the electrode can be positioned relative to the crucible to prevent such short circuit action and thereby assure continued melting operation until the electrode has been consumed.

The primary object of this invention is to provide an improved arc furnace which is highly efficient by virtue of its construction wherein an electrode to be melted can be handled in a simple and expeditious manner before and during a melting operation even though the electrode is warped or bent along its length.

Another object of this invention is to provide an arc furnace of the type described which has a rotatable mounting structure coupled to the electrode holder and a vacuum manifold provided with a filter in the mounting structure whereby the holder can move from one operative position to another without affecting the vacuum manifold or the filter thereof.

A further object of the invention is to provide an arc furnace of the aforesaid character wherein an electrical power lead aligned with the axis of rotation of the holder is connected thereto by a releasable clamp so that, when the clamp is released, the holder can rotate between its operative position without disturbing the position of the power lead and its particular mounting structure.

Still another object of the present invention is to provide an electrode holder for an arc furnace of the type described wherein the holder has an electrode suspension unit which permits adjustment of the lateral position of an electrode within a crucible to compensate for a warped or bent region or other dimensional irregularity along the length of the electrode itself.

A further object of this invention is to provide an electrode holder for an arc furnace of the type described wherein the holder has electrode attachment means at one end thereof which automatically attaches to an electrode as the holder moves in a predetermined direction relative to the electrode to thereby preclude manual attachment of the electrode to the holder.

Other objects of this invention will become apparent as the following specification progresses, reference being had to the accompanying drawings for an illustration of a preferred embodiment of the arc furnace.

Another object of this invention is the provision of an electrical attachment means including a pair of oppositely tapered collars on the electrode holder and an electrode wherein one of the collars is telescoped in the other collar so as to become wedged therein to provide a positive electrical contact.

In the drawings:
FIG. 1 is a front elevational view of the arc furnace of this invention, parts being broken away and in section to illustrate details of construction;

Figure 1:
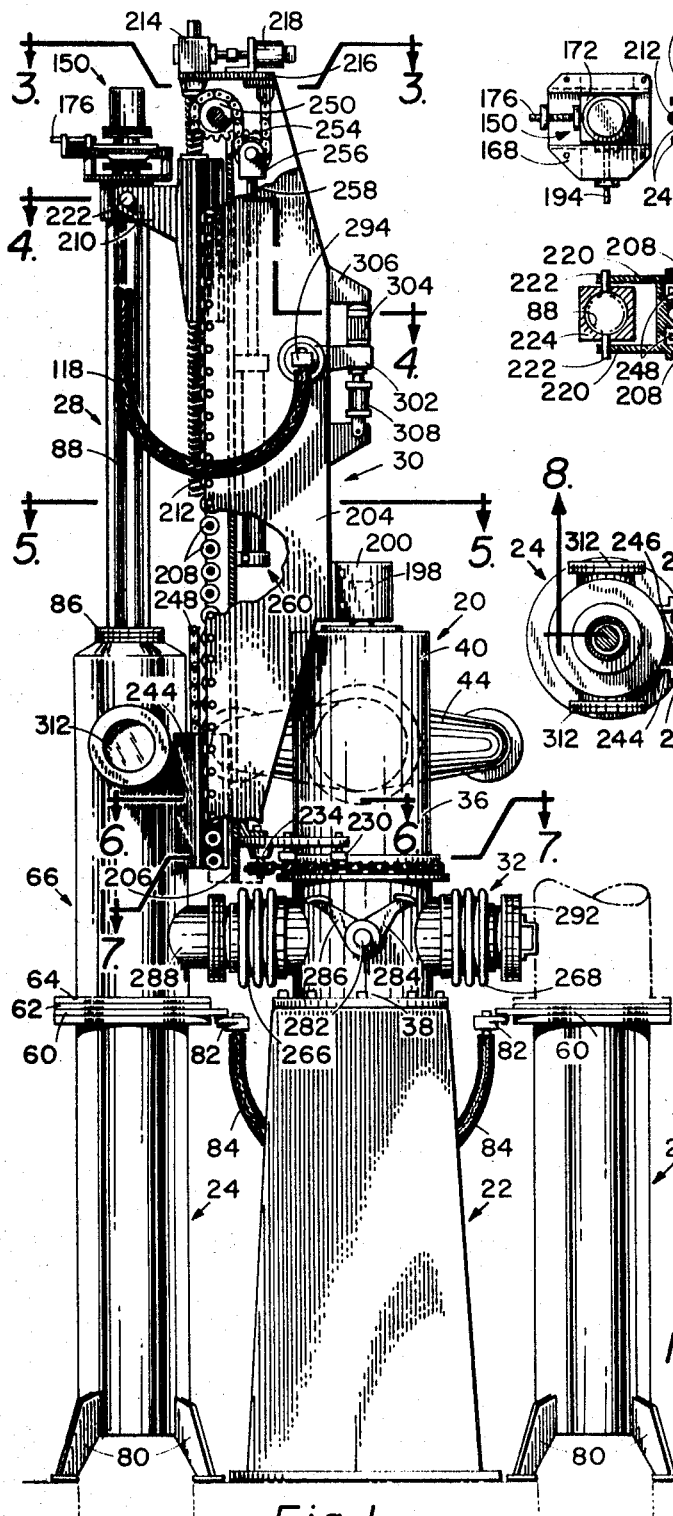

The preferred embodiment of the arc furnace of this invention is broadly denoted by the numeral 20 and includes a fixed support 22, a pair of spaced, generally upright, open top crucibles 24 and 26, an electrode holder 28, means 30 rotatably mounting holder 28 on support 22, and vacuum means 32 carried by the support for evacuating a crucible coupled with holder 28. The holder is shiftable for a position shown in FIG. 1 aligned and coupled with crucible 24 to a position aligned and coupled with crucible 26. Conduit means hereinafter described is coupled with the holder in either operative position thereof to permit the evacuation of the crucible to which the holder is coupled.

Figure 5:
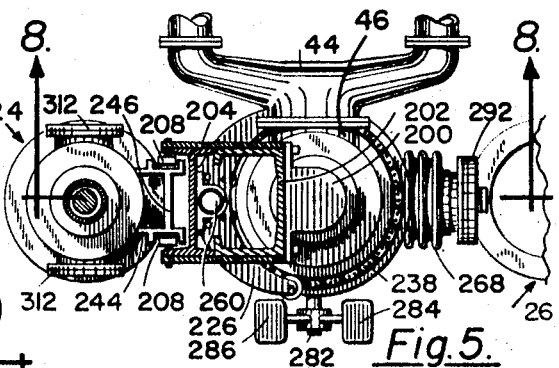
FIG. 5 is a cross sectional view taken along line 5—5 of FIG. 1.
Figure 6:
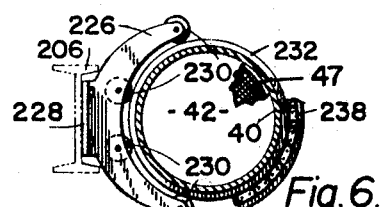
FIG. 6 is a cross sectional view taken along line 6—6 of FIG. 1.
Figure 7:
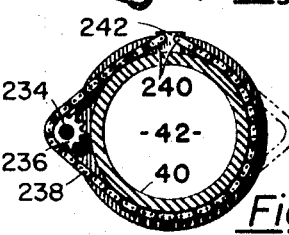
FIG. 7 is a cross sectional view taken along line 7—7 of FIG. 1.
Figure 8:
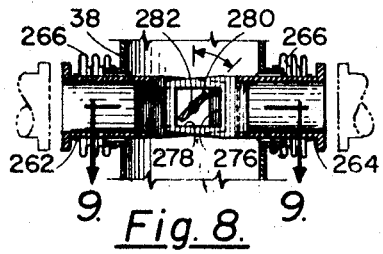
FIG. 8 is a cross sectional view taken along line 8—8 of FIG. 5.

Support 22 includes a pedestal 34 having a support housing or pylon 36 on the upper end thereof (FIG. 1). Housing 36 has a lower section 38 and an upper section 40, sections 38 and 40 being in fluid communication with each other to define a vacuum manifold or chamber 42 (FIGS. 6–8). Chamber 42 is adapted to be coupled by means of conduit structure 44 (FIGS. 1 and 5) to a source of vacuum, such as a force pump or the like. To this end, structure 44 is removably connected to a lateral extension 46 projecting from an opening in the side of section 40. A relatively large filter 47 (FIG. 6) is positioned in chamber 42 for filtering solid particles or condensate removed from a crucible during a melting operation. Filter 47 is accessible for cleaning by removing conduit 44 and the height of pedestal 34 allows the cleaning of the filter at floor level.

Figure 2:
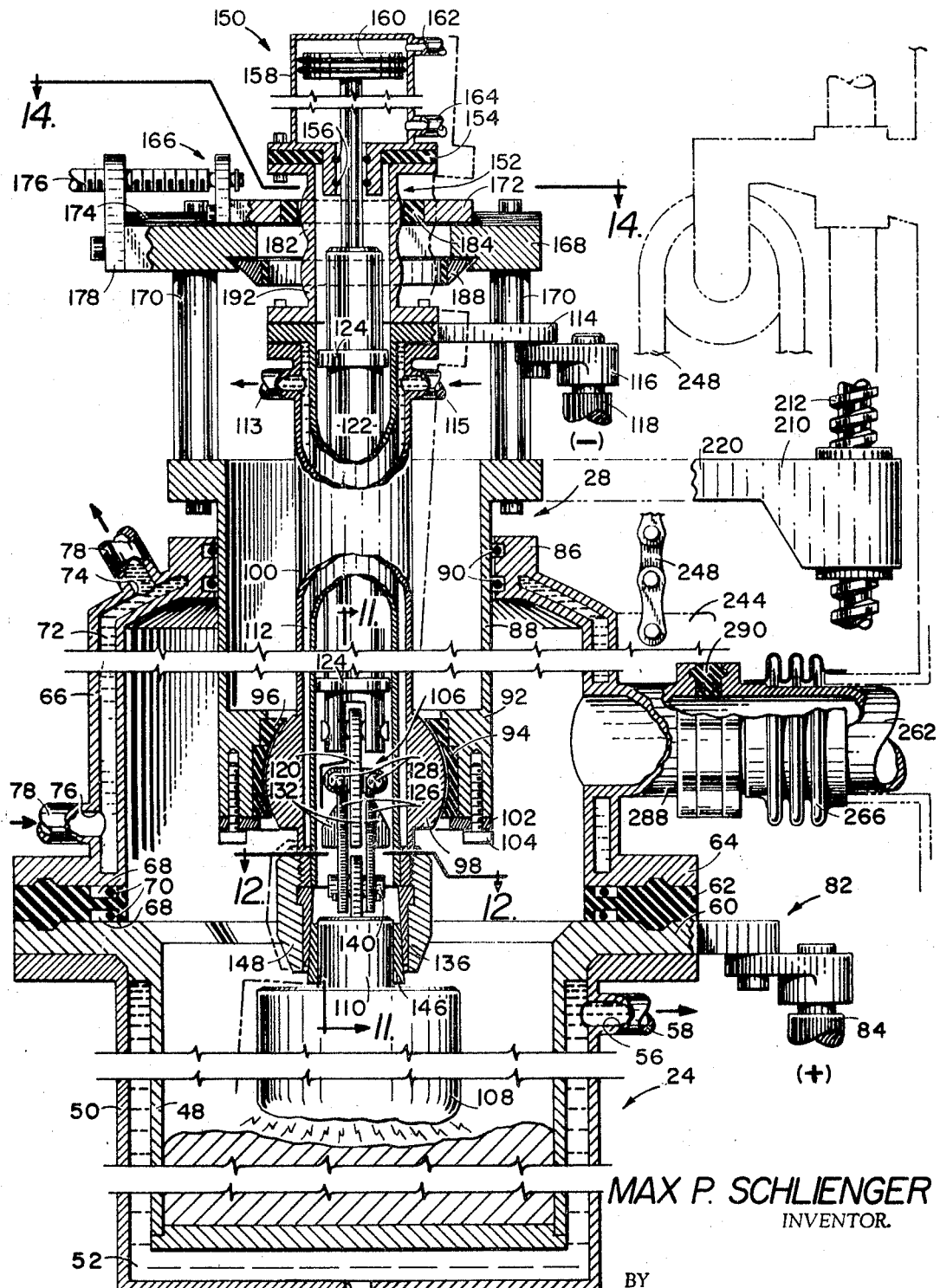
FIG. 2 is a vertical section through a part of the furnace, showing the electrode holder and one of the crucibles.
Figure 15:
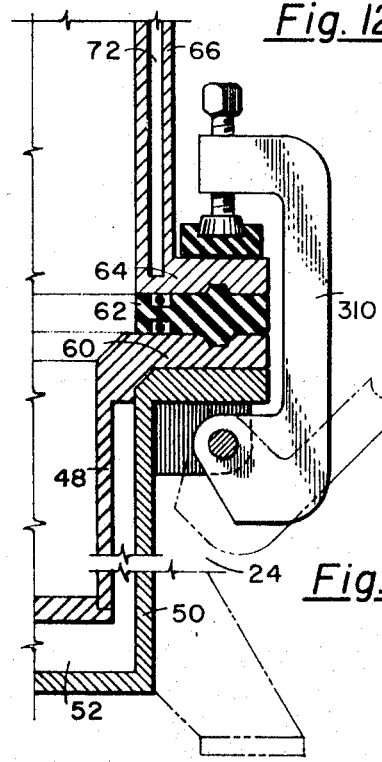
FIG. 15 is a fragmentary vertical section of the holder and a crucible and showing the connection means therefor.

Each of the crucibles 24 and 26 has cylindrical inner and outer walls of 48 and 50 (FIGS. 2 and 15 to present a coolant chamber 52 having ports 54 and 56 permitting a coolant to flow through the chamber. Thus, the crucible can be cooled during the melting operation which occurs therewithin. Pipes 58 connect ports 54 and 56 to a source of coolant.

Each crucible has an annular flange 60 surrounding the open top thereof and against which a gasket 62 is forced by an annular flange 64 on a tubular crucible cover 66 forming a part of holder 28. Flanges 60 and 64 have annular grooves in the opposed faces thereof to complementally receive annular ribs on gasket 62 as shown in FIG. 2. Also, gasket 62 has angular grooves 68 for receiving O-ring seals 70 for sealing the junction between flanges 60 and 64. Cover 66 is of a double walled construction as shown in FIG. 2 to present a coolant-receiving chamber 72 whose ports 74 and 76 are adapted to be coupled by pipes 78 to a coolant source.

Each crucible is mounted on legs 80 on a suitable supporting surface on opposed sides of support 22 (FIG. 1). Also, each crucible is formed from a suitable electrically conductive material and has a lug 82 connecting it to a flexible electrical conductor 84 (FIGS. 1 and 2) which, in turn, is adapted to be coupled to a source of electrical power.

Cover 66 includes an annular top portion 86 (FIG. 2) which shiftably receives and surrounds a tubular outer member 88 forming another part of holder 28. O-ring seals 90 seal the junction between portion 86 and member 88.

Member 88 has an inner mounting flange 92 on the lower end thereof (FIG. 2) for receiving an annular insulator 94 and an annular seal 96. Insulator 94 and seal 96 are in end-to-end relationship and have spherical inner surfaces to provide a seat for a spherical segment or ball 98 rigid to the outer surface of a tubular member 100 extending through member 88. Ball 98 is shiftable in all directions relative to insulator 94 and seal 96 to present therewith a ball and socket joint which permits member 100 to pivot relative to member 88 about axes transverse to the longitudinal axes of member 88. A ring 102 is secured to the bottom face of member 88 (FIG. 2) by screws 104 to retain insulator 94 and seal 96 within respective stepped portions of flange 92.

Member 100 forms a part of an electrode suspension unit which is adapted to be coupled by electrode attachment means 106 to the upper end of an electrode 108 having a stub 110 secured thereto. Member 100 is formed from electrically conductive material and is of a double walled construction to present a coolant chamber 112 having ports 113 and 115 which are adapted to be coupled to a source of coolant. The upper end of member 100 has a lateral plate 114 secured thereto and a lug 116 couples plate 114 to a flexible electrical conductor 118.

Figure 10:
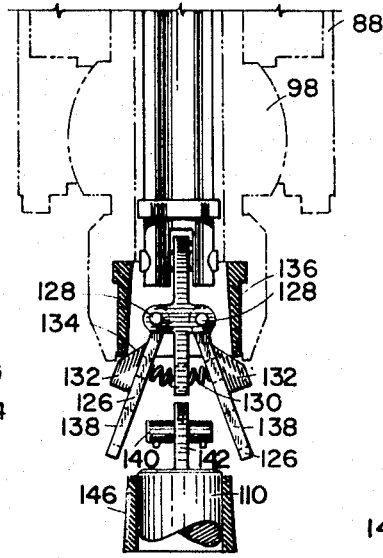
FIG. 10 is a cross fragmentary cross sectional view, partly in phantom, of the electrode holder and the electrode attachment means thereof.
Figure 11:
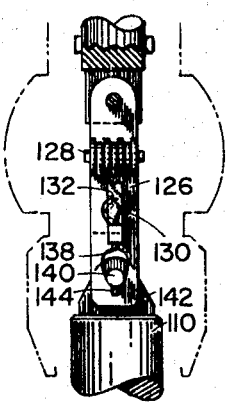
FIG. 11 is a cross sectional view taken along line 11—11 of FIG. 2.

Attachment means 106 includes a plate extension 120 (FIGS. 2, 10 and 11) which is secured to the lower end of a suspension rod 122 mounted for longitudinal reciprocation within member 100. Annular spacers 124 on rod 122 maintain the latter concentric with member 100. Attachment means 106 further includes a pair of arms 126 which are swingably mounted by pins 128 on opposed sides of plate extension 120 whereby the arms can move toward and away from each other as shown in FIG. 10. Coil springs 130 bias arms 126 away from each other. Each arm has a projection 132 provided with a bevelled edge defining a cam surface 134 engageable with the lower edge of a collar 136 secured to the lower end of member 100. Thus, as rod 122 is elevated, cam surfaces 134 engage collar 136 and cause arms 126 to swing toward each other against the bias forces of spring 130. Movement of the rod in the opposite direction allow the arms to spread apart as projection 132 move out of collar 136.

Figure 13:
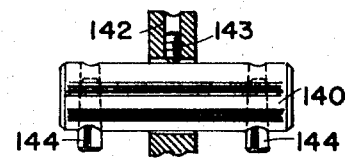
FIG. 13 is a cross sectional view taken along line 13—13 of FIG. 12.

Each of the arms 126 has an aperture 138 therethrough (FIG. 11) which has a greater transverse dimension than a suspension pin 140, the latter being releasably secured to a projection 142 on the upper end of stub 110 by a set screw 143 (FIG. 13). Pin 140 has a pair of pin extensions 144 also as arms 126 move toward each other. Thus, pin 140 and pin extension 144 are received within the apertures to couple arms 126 to stub 110. Continued upward movement of rod 122 causes the lower ends of arms 126 to be positioned between the center of pin 140 and respective pin extensions 144 so that the pin extensions serve as stops against outward movement of arms 126 in the manner shown in FIG. 11 so long as pin 140 is carried by arms 126.

Figure 12:
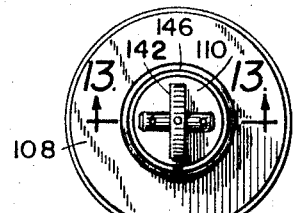
FIG. 12 is a cross sectional view taken along line 12—12 of FIG. 2.

The inner surface of collar 136 is tapered (FIG. 10)

to receive a collet 146 which comprises a split ring as shown in FIG. 12. The outer surface of collet 146 is reversely tapered relative to the inner surface of collar 136 so that there is a wedging action as the collet is moved into the collar. This wedging action follows the coupling of arms 126 to suspension pin 140 and is caused by further upward movement of rod 122 in member 100. Collar 136 is electrically conductive and is connected by a tubular, electrically conductive element 148 to the lower end of member 100 (FIG. 2).

To shift the rod 122 longitudinally of member 100, a fluid actuated piston and cylinder assembly 150 (FIGS. 1 and 2) is mounted on the upper end of member 100 by means of a tubular extension 152. An electrical insulator 154 electrically isolates assembly 150 from member 100. Moreover, O-ring seals 156 isolate assembly 150 from the interior of member 100.

Assembly 150 includes a cylinder 158 having a shiftable piston 160 therewithin coupled to rod 122. Ports 162 and 164 on opposed sides of the piston are adapted to be coupled to a source of fluid under pressure so that the piston can be controllably raised and lowered to, in turn, raise and lower rod 122. When the piston is raised, it first causes arms to swing together toward pin 140 and then causes collet 146 to become wedged in collar 136. Lowering of piston 116 first forces collet 146 out of collar 136 and then allows arms 126 to swing apart.

Figure 14:
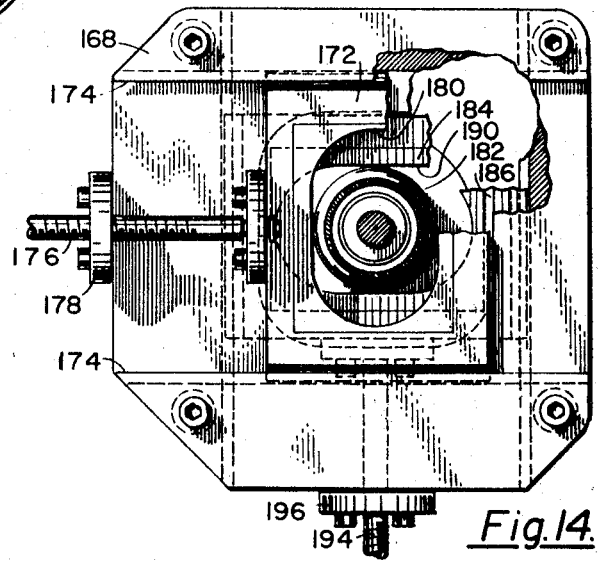
FIG. 14 is a cross sectional view taken along line 14—14 of FIG. 2.

If electrode 108 is warped or bent, it can be adjustably positioned in the corresponding crucibles so that it remains out of electrical contact therewith. To this end, adjustment means broadly denoted by the numeral 166 is provided on the upper end of member 88 and is coupled to the upper end of 100 for shifting the latter relative to member 88. Means 166 includes a support plate 168 mounted by spacers 170 on the upper end of member 88 (FIG. 2). A first adjustment element 172 (FIGS. 2 and 14) is mounted for movement on the upper surface of support plate 168 between a pair of spaced, generally parallel, vertical shoulders 174 which provide spaced tracks for guiding the movement of element 172. A screw 176 is threadably carried by an extension 178 secured to support plate 168 and is coupled in a suitable manner to element 172 to shift the same along plate 168 as screw 176 is rotated.

Element 172 has a slot 180 extending transversely of the direction of movement thereof. Extension 152 secured to the upper end of member 100 extends through slot 180 and has a spherical annular surface 182 (FIG. 2) which engages an annular insulator 184 carried by element 172. The sphericity of surface 182 is provided to allow rotation of member 100 about the ball and socket joint as element 172 translates. The movement of element 172 from left to right in FIG. 2 causes member 100 to rotate or rock in a clockwise sense, i.e., about an axis substantially parallel to pins 128 (FIG. 2).

Another adjustment element 186 (FIGS. 2 and 14) is shiftably mounted on support plate 168 for movement in opposed directions perpendicularly to the direction of movement of element 172. To this end, element 186 has tapered side surfaces 188 and is shiftably received in a recess in the underside of plate 168. The sides of the recess are complementary to side surfaces 188 to guide the latter. Element 186 has a slot 190 which is transverse to slot 180 (FIG. 14) and a suitable insulator (not shown) spans the distance between the outer periphery of slot 190 and a spherical surface 192 on extension 152. A screw 194 threadably carried by extension 196 secured to plate 168 is coupled to element 186 for shifting the latter in opposed directions relative to plate 168. The movement of element 186 causes member 100 to pivot about an axis perpendicular to pins 128. Thus, member 100 can move in two degrees of freedom relative to member 88 in order to position electrode 108 properly in the crucible to prevent an electrical short circuit between the two components in the event that the electrode is warped or bent.

Figure 4:
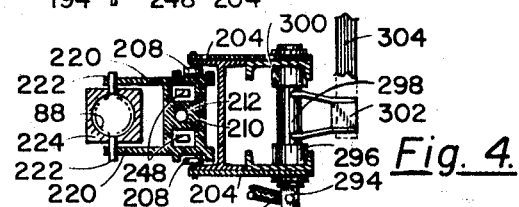
FIG. 4 is a cross sectional view taken along line 4—4 of FIG. 1.

Mounting means 30 for holder 28 includes a shaft 198 extending upwardly from section 40 (FIG. 1). A hub 200 is rotatably mounted on shaft 198 and is secured to the lower end of a C-shaped channel 202 (FIG. 5). A pair of rigid side plates 204 are secured to the opposed sides of channel 202 and extend above and below the same. An I-beam 206 (FIG. 5) extends substantially throughout the entire length of plate 204 in spaced, parallel relationship to shaft 198 and is provided with first and second columns of vertically aligned, spaced rollers 208 rotatably secured to the opposed flanges of beam 206 (FIGS. 4 and 5). Rollers 208 provide roller guides for a vertically shiftable carriage 210 (FIGS. 1 and 4) to which a vertically disposed screw 212 is coupled. The upper end of the screw is coupled to a gear box 214 positioned on a support plate 216 on the upper end of side plates 204 (FIG. 1). A reversible motor 218 is coupled with gear box 214 and supplies mechanical power thereto whereby the screw can be rotated in opposite directions to permit raising and lowering of the carriage.

Carriage 210 has a pair of arms 220 (FIGS. 1 and 4) which extend laterally from I-beam 206 and are coupled in any suitable manner to member 88. For purposes of illustration, the arms are connected by pins 222 to a connecting block 224 (FIG. 4) secured to the upper end of member 88. Block 224 is omitted from FIG. 2 for clarity. Raising and lowering of cariage 210 by rotating screw 212 on opposed directions causes member 88 to be shifted relative to cover 66 when the latter is secured in the manner shown in FIG. 2 to a crucible.

To support the lower end of I-beam 206, a crescent-shaped guide 226 (FIGS. 1, 5 and 6) is secured by a bracket 228 to I-beam 206. Guide 226 has a pair of rollers 230 which are in rolling engagement with an annular guide track 232 secured to the bottom of section 40 (FIG. 1). A shaft 234 (FIGS. 1 and 7) extends downwardly from guide 226 and has a sprocket 236 thereon which is coupled to a link chain 238 whose ends 240 are secured in any suitable manner to a flange 242 at the bottom of section 40 (FIG. 7). Chain 238 effectively prevents canting of the lower end of mounting means 30 as the latter rotates about shaft 198.

Figure 3:
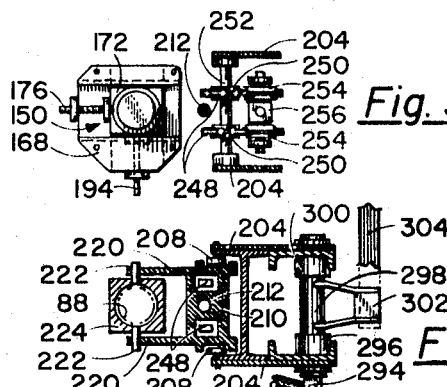
FIG. 3 is a cross sectional view taken along line 3—3 of FIG. 1.

Cover 66 has a pair of connecting plates 244 (FIGS. 2 and 5) extending laterally therefrom, plates 244 being interconnected by a central web 246 and provided with grooves for receiving rollers 208 whereby the plates are guided for longitudinal movement along I-beam 206. A pair of link chains 248 are secured in any suitable manner to respective plates 244 and extend upwardly therefrom. Chains 248 pass over respective sprockets 250 secured to a shaft 252 journaled between side plates 204 (FIG. 3). The chains then pass downwardly and about another pair of sprockets 254 carried by a U-shaped member 256 on the upper end of a rod 258. The ends of the chains are secured in any suitable manner to the underside of support plate 216 (FIG. 1).

Rod 258 forms a part of a fluid piston and cylinder assembly 260 carried in any suitable manner between side plates 204. When assembly 260 is actuated to urge rod 258 downwardly, cover 66 is caused to raise and move along member 88. The weight of cover 66 maintains tension on the chains so that rod 258 is biased upwardly.

Figure 9:
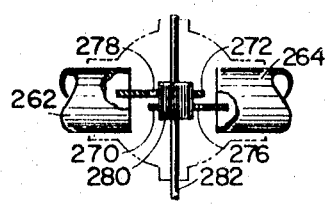
FIG. 9 is a view taken in the direction of line 9—9 of FIG. 8.

Vacuum means 32 includes a pair of flanged conduits 262 and 264 (FIGS. 2 and 8) shiftably carried by extensible bellows 266 and 268 on opposed sides of section 38. The bellows bias conduits 262 and 264 away from each other and allow the conduits to shift relative to section 38. The conduits are provided with the respective inwardly extending plates 270 and 272 (FIGS. 8 and 9). The plates have holes 274 therethrough defining respective inner edges 276 and 278 which are engaged by a rigid plate 280 carried by a shaft 282 extending through and being rotatable relative to section 38. Foot pedals 284 and 286 are coupled to shaft 282 for rotating the same in opposite directions. When it is desired to move conduits 262 and 264 toward each other and into the full line positions of FIG. 8, shaft 282 is rotated in a clockwise sense when viewing FIGS. 1 and 8 by an operator stepping on foot pedal 284. This causes plate 280 to move into engagement with respective edges 276 and 278, resulting in the movement of the conduits toward each other. When the operator forces pedal 286 downwardly, shaft 282 is rotated in the opposite direction and the conduits are allowed to return to their normal positions extending outwardly from each other.

Cover 66 is provided with a flanged conduit 288 which mates with one of the conduits 262 and 264 in the manner shown in FIGS. 1 and 2. A gasket 290 is provided between the flanges of the aligned conduits. A cap 292 is coupled in any suitable manner to the outer end of the conduit of section 38 which is not in use. Since conduits 262 and 264 communicate with vacuum chamber 42, cover 66 and the crucible coupled thereto will be in fluid communication with chamber 42 so that the crucible can be evacuated during an electrode melting operation.

To supply electrical power to flexible electrical conductor 118, the latter is connected to a lug 294 (FIG. 4) extending laterally from one of the side plates 204 and electrically coupled to a cup-shaped bearing 296 rotatably carrying one end of an electrically conductive bar 298. The opposite ends of the bar is journalled in a cup-shaped bearing 300 carried by the opposite side plate 204 and a contact member 302 is rigidly secured to bar 298 in spaced relationship thereto. Member 302 provides one of a pair of jaws for electrically engaging a power lead 304 which is horizontally disposed in the manner shown in FIGS. 1 and 4 and which is in intersecting vertically aligned with hub 200 and in relationship to its axis of rotation. A fixed lateral projection 306 rigidly secured to plates 204 provides the other jaw which is aligned with member 302. A fluid piston and cylinder assembly 308 is coupled with member 302 and causes the latter and thereby bar 298 to rotate relative to bearings 296 and 300 whereby power lead 304 can be alternately clamped and unclamped between the jaws formed by member 302 and projection 306. In this way, electrical contact can be made between member 100 and power lead 304. When the clamping action is released, mounting means 30 can rotate holder 28 about the axis of shaft 198 without disturbing the position of power lead 304. Thus, the same can be permanently mounted with respect to furnace 20.

OPERATION

To place furnace 20 in operation, an electrode to be melted will initially be disposed in one of the crucibles. Assuming the electrode is positioned in crucible 24 and stub 110 is welded to the electrode, mounting means 30 for holder 28 is rotated to a position with holder 28 aligned with crucible 24. Both cover 66 and member 88 will be elevated so that they will be above the electrode which normally will be supported by clamps on flange 60 of crucible 24. Member 88 is elevated when carriage 210 is near the upper end of screw 212 and cover 66 is elevated when rod 258 is shifted toward its lowermost position.

Member 88 is then lowered until arms 126 are in the position relative to suspension pin 140 in the manner shown in FIG. 10. These arms then are ready to be coupled with the pin to thereby couple the electrode to holder 28. It is assumed that pin 140 will have been coupled to projection 142 on stub 110 and that collet 146 will have been placed on stub 110 to ready the electrode for the melting operation.

Suspension rod 122 is then elevated within member 100 by actuating piston and cylinder assembly 150. This will cause the arms to swing together and receive pin 140 and apertures 138. Continued movement of the suspension rod 122 will elevate the electrode and thereby urge collet 146 into electrical engagement with the inner surface of collar 136 in the manner shown in FIG. 2. Thus, the electrode is both mechanically and electrically coupled to member 100. Cover 66 can then be lowered onto flange 60 of crucible 24 and flanges 60 and 64 are suitably interconnected, such as by a clamp 310 of the type shown in FIG. 15. The crucible and the cover then form a chamber which is to be evacuated to draw off impurities in the gaseous state resulting from the melting operations.

When cover 66 closes the crucible, conduit 288 is aligned with conduit 262 and the latter will have previously been moved inwardly of section 38 to the full line position of FIG. 8 to allow conduit 288 to move into alignment therewith. Thereafter, pedal 286 will be forced downwardly to force the conduit 262 against conduit 288 in the manner shown in FIG. 2. Any suitable means may be used to interconnect the end flanges of conduits 262 and 268. Cap 292 will then be placed on the outer end of conduit 264 and conduit 44 will be connected to a vacuum source to evacuate chamber 42 and thereby crucible 24.

The adjustment of the position of the electrode in the crucible will then be made to assure that it does not electrically contact the inner wall 48 of the crucible. An electrical continuity check can be used for this purpose. If the electrode is found to engage the wall, adjustment of the position of member 100 relative to member 88 will be made by manipulation of screws 176 and 194. This will shift the upper end of member 100 relative to plate 168 until the electrode is moved out of engagement with wall 48.

Electrical contact between member 88 and lead 304 will then be made by shifting contact member 302 upwardly and into engagement with lead 304 by actuating piston and cylinder assembly 308. Conductor 84 and lead 304 will form a part of an electrical power circuit including a power source and a power switch so that, once the switch is closed, electrical current will flow through the circuit.

The various coolant chambers will be coupled with a source of coolant, such as water or the like. Chambers 52, 72 and 112 will receive the coolant and cool the crucible, the cover and member 100, respectively, so that the heat generated by the arc and the electrical current sustaining the arc will not cause structural damage to the various parts of the furnace.

The furnace is now ready for the melting operation. To initiate the arc, the power switch coupled with conductor 84 and power lead 304 is closed and an electrical field will be established between the bottom of the crucible and the lower end of the electrode. This field will be great to create an arc which will initiate and sustain the melting of the electrode. The melted electrode will be deposited in the crucible and impurities initially in the solid state in the electrode will become gaseous and be driven off from the crucible by the suction created by the vacuum source coupled with chamber 42. The deposited metal in the crucible will therefore be relatively pure.

As the melting operation progresses, it generally will be necessary to advance the electrode into the crucible to sustain the arc. This is accomplished by actuating motor 218 which rotates screw 212 in the proper direction to advance carriage 210 and thereby member 88 downwardly. The rate at which the electrode is lowered can be previously determined. If it is necessary to view the interior of cover 66 at any time, a pair of viewing windows 312 are provided on opposed sides of the cover.

As soon as the electrode has been sufficiently melted, the power switch is opened to stop the current flow and to interrupt the arc. Member 88 is then elevated and clamp 310 is removed from the position of FIG. 15 to allow cover 66 to be elevated. The remaining part of the electrode still carried by member 100 can be separated from the latter by actuating piston and cylinder assembly 150 to force suspension rod 122 downwardly. This will force collet 146 out of collar 136 and allow arms 126 to swing apart. Suspension pin 140 is released from arms 126. Conduit 262 can be released from conduit 288 and shifted away therefrom by stepping on pedal 284. Contact member 302 is then shifted downwardly relative to power lead 304. Thus, holder 28 is now ready to be rotated to another operative position.

Holder 28 is then rotated in a counterclockwise sense when viewing FIG. 5 into a position aligned with crucible 26. The foregoing steps will then be repeated to ready the furnace for another melting operation. During the subsequent melting operation, the metal deposited in crucible 24 can cool to a safe handling temperature. Thus, furnace 20 allows more efficient operation by minimizing the shut-down time of the system.

The crucibles are preferably formed with a taper on wall 48 so that the cylindrical part of the crucible can be stripped from the deposited metal after the latter has solidified and cooled. A second melting operation can be conducted with the deposited metal to further purify the same. This will require a larger crucible which can replace crucible 24 adjacent to support 22.

I claim:

1. In an arc furnace: a support; a pair of spaced, open top crucibles; an electrode holder; means mounting said electrode holder on said support for movement from a first operative position aligned with the open top of one of said crucibles to a second operative position aligned with the open top of the other crucible, said holder having structure movable into a location closing the open top of a crucible when the holder is in the corresponding operative position; and means coupled to mounting means and capable of being connected to a vacuum source for evacuating a crucible when the latter is closed by said structure.

2. In an arc furnace: a pair of spaced, generally upright, open top crucibles; a support spaced from said crucibles; an electrode holder; means mounting the holder on said support for movement from a first position with the holder aligned with the open top of one of the crucibles to a second position aligned with the open top of the other crucible; closure structure mounted on said holder and movable relative thereto into a location for closing the open top of a crucible when the holder is in the corresponding position; means defining a vacuum chamber within said support; and conduit means movable with said holder for removably placing said chamber in fluid communication with a crucible when the latter is closed by said structure, whereby the closed crucible can be evacuated.

3. In an arc furnace: a support; an ingot holder; means mounting the holder on said support for rotation from a first operative position to a second operative position; an electrically conductive power lead aligned with the axis of rotation of said holder and fixed relative to said support; and means adjacent to said axis for electrically and releasably coupling the holder to said power lead when the holder is in either of said positions.

4. In an arc furnace, an electrode suspension assembly comprising: an elongate mounting member; an electrode suspension unit extending along said member and having electrode attachment structure adjacent to one extremity thereof; means coupled to said suspension unit for pivotally connecting the same to said member adjacent to one end of the later; and means on said member for shifting the suspension unit into any one of a number of operative positions relative to said member.

5. In an arc furnace, an electrode suspension assembly comprising: a tubular mounting member; an electrode suspension unit extending through said member and having electrode mounting structure adjacent to one end of the unit; means adjacent to one end of the member for pivotally connecting said suspension unit thereto; and means carried by said member adjacent to the opposite end thereof for shifting said suspension unit relative to said member.

6. In an arc furnace, an electrode suspension unit comprising: an outer hollow member; an inner, elongated member within and shiftable longitudinally of said outer member; a pair of arms shiftably mounted on said inner member for movement toward and away from each other; each arm having an aperture therethrough; pin means adapted to be secured to an electrode at a location thereon permitting said pin means to be received within the apertures of said arms as the latter move in predetermined directions relative to each other; cam means on said arms and engageable with said outer member for moving said arms in said predetermined directions in response to the movement of said inner member toward one end of said outer member; and means coupled with said inner member for shifting the same relative to the outer member.

7. In an arc furnace as set forth in claim 6, wherein is provided spring means biasing said arms in directions opposite to said predetermined directions; said pin means being provided with a pair of transverse pin extensions on opposed ends thereof, each of said apertures having a transverse dimension greater than the sum of the corresponding transverse dimension of said pin means and the length of the corresponding pin extension, whereby the apertures will receive the pin means and respective pin extensions when the arms move in said predetermined directions and said pin extensions will comprise stops for the arms when the latter carry said pin means.

8. In an arc furnace: a pair of spaced, generally upright, open top crucibles; a support spaced from said crucibles; an outer, tubular member; an inner member within said outer member and having electrode attachment means on the lower end thereof; ball joint means pivotally connecting the inner member to the outer member at a location adjacent to said lower end of the inner member; means coupled with said inner member for pivoting the same about a pair of angularly disposed axes through said ball joint means; means mounting the outer member on said support for movement from a first position with the members aligned with the open top of one of the crucibles to a second position aligned with the open top of the other crucible; structure carried by said outer member for closing the open top of a crucible when the member is in the corresponding position; means defining a vacuum chamber within said support; and conduit means placing said chamber in fluid communication with a crucible when the latter is closed by said structure, whereby the closed crucible can be evacuated.

9. In an arc furnace as set forth in claim 8, wherein said inner member is tubular, said attachment means including a suspension rod within and movable longitudinally of said inner member, a pair of arms swingably mounted on said suspension rod adjacent to the lower end thereof and having means engageable with said inner member for swinging the arms toward each other as the suspension rod moves in one direction relative to the inner member, each arm having an aperture therethrough, a suspension pin adapted to be secured to an electrode, said pin being disposed transversely of said suspension rod and being receivable within the apertures of the arms as the latter are swung toward each other, and means coupled with said suspension rod for moving the same in said direction.

10. In an arc furnace: a pair of spaced, generally upright, open top crucibles; a support spaced from said crucibles; an electrode holder; means rotatably mounting the holder on said support for movement from a first position with the holder aligned with the open top of one of the crucibles to a second position aligned with the open top of the other crucible; structure carried by said holder for closing the open top of a crucible when the holder is in the corresponding position; means defining a vacuum chamber within said support; conduit means placing said chamber in fluid communication with a crucible when the latter is closed by said structure, whereby the closed crucible can be evacuated; an electrically conductive power lead aligned with the axis of rotation of said holder; and means electrically and releasably interconnecting the holder and said power lead.

11. An arc furnace comprising: a pair of spaced, generally upright, open top crucibles; a support spaced from said crucibles; an electrode holder including a suspension unit; means mounting the holder on said support for movement from a first position with the holder aligned with the open top of one of the crucibles to a second position aligned with the open top of the other crucible, said suspension unit being shiftably mounted on said mounting means; power means carried by said mounting means for moving the suspension unit toward and away from the open top of a crucible aligned with the holder; structure carried by said holder for closing the open top of a crucible when the holder is in the corresponding position; means defining a vacuum chamber within said support; and conduit means movable with said holder for removably placing said chamber in fluid communication with a crucible when the latter is closed by said structure, whereby the closed crucible can be evacuated.

12. In an arc furnace: a support; a pair of spaced, open top crucibles; an electrode holder; means mounting said electrode holder on said support for movement from a first operative position aligned with the open top of said crucibles to a second operative position aligned with the open top of the other crucible, said holder having structure for closing the open top of a crucible when the holder is in the corresponding operative position; a vacuum manifold; means connected to said manifold for removably placing the latter in fluid communication with a crucible; and means within said manifold for filtering the material flow therein.

13. In an arc furnace: a pair of spaced, generally upright, open top crucibles; a support spaced from said crucibles; an electrode holder; means mounting the holder on said support for movement from a first position with the holder aligned with the open top of one of the crucibles to a second position aligned with the open top of the other crucible; structure carried by said holder for closing the open top of a crucible when the holder is in the corresponding position; means defining a vacuum chamber within said support; means on said mounting means for shifting the structure relative to the holder into and out of closing relationship to the top of a crucible; and conduit means movable with said holder for removably placing said chamber in fluid communication with a crucible when the latter is closed by said structure, whereby the closed crucible can be evacuated.

14. In an arc furnace: a pair of spaced, generally upright, open top crucibles; a support spaced from said crucibles; an electrode holder; means mounting the holder on said support for movement from a first position with the holder aligned with the open top of one of the crucibles to a second position aligned with the open top of the other crucible; structure carried by said holder and movable relative thereto independently of said holder for closing the open top of a crucible when the holder is in the corresponding position; first means coupled with said structure for moving the latter into and out of closing relationship to the open top of a crucible; second means coupled with said holder for moving the same toward and away from a crucible aligned therewith; means defining a vacuum chamber within said support; and conduit means movable with said holder for removably placing said chamber in fluid communication with a crucible when the latter is closed by said structure, whereby the closed crucible can be evacuated.

15. In an arc furnace: a support; an ingot holder; means mounting the holder on said support for rotation from a first operative position to a second operative position; an electrically conductive power lead aligned with the axis of rotation of said holder and fixed relative to said support; a pair of relatively shiftable jaws carried by said mounting means and engageable with said power lead on respective, opposed sides thereof for electrically coupling the holder to the power lead; and means coupled with one of the jaws for moving the same toward the other jaw, whereby the power lead is clamped between the jaws.

16. In an arc furnace: a support; an ingot holder; means mounting the holder on said support for rotation from a first operative position to a second operative position; an electrically conductive power lead aligned with the axis of rotation of the holder and fixed relative to said support; a releasable clamp engageable with said power lead; and a flexible electrical conductor connecting said clamp with said holder.

17. In an arc furnace, an electrode suspension assembly comprising: a tubular mounting member; an electrode suspension unit extending through said member and having electrode mounting structure adjacent to one end of the unit; means adjacent to one end of the member for pivotally mounting said suspension unit thereon; means carried by said member adjacent to the opposite end thereof for shifting said suspension unit relative to said member; a crucible cover mounted on said tubular member for movement longitudinally thereof; a first fluid seal at the junction of said member and said cover; and a second fluid seal at said pivot means.

18. In an arc furnace, an electrode suspension assembly comprising: a tubular mounting member; an electrode suspension unit extending through said member and having electrode mounting structure adjacent to one end of the unit; a ball joint adjacent to one end of the member for pivotally mounting said suspension unit thereon; and a pair of mutually perpendicular adjustable devices coupled to said suspension unit and carried by said member adjacent to the opposite end thereof for shifting said suspension unit relative to said member.

19. In an arc furnace, an electrode suspension assembly comprising: a tubular mounting member; an electrode suspension unit extending through said member and including a hollow outer member and an elongated inner member within and shiftable longitudinally of the outer member, said inner member having electrode attachment structure thereon including shiftable means movable in response to the movement of said inner member to couple an electrode thereto; means adjacent to one end of the member for pivotally mounting said suspension unit thereon, said attachment structure being adjacent to said pivot means; and means carried by said tubular member adjacent to the opposite end thereof for shifting said inner member relative thereto.

20. In an arc furnace as set forth in claim 19, wherein said outer member is electrically conductive and has a tapered surface adjacent to said attachment structure, and including an electrically conductive element adapted to be electrically coupled to an electrode and having a face tapered oppositely to the taper of said surface, said element being movable into engagement with said surface when said inner member is moved relative to the outer member.

References Cited
UNITED STATES PATENTS

| | | | |
|---|---|---|---|
| 2,848,524 | 8/1958 | McLaughglin et al. | 13—31 |
| 2,942,049 | 6/1960 | Carr et al. | 13—14 XR |
| 3,190,949 | 6/1965 | Gruber et al. | 13—9 XR |
| 3,202,751 | 8/1965 | Wooding | 13—31 |
| 3,057,935 | 10/1962 | Garmy | 13—15 XR |
| 3,240,856 | 3/1966 | Wynne | 13—14 |
| 2,857,445 | 10/1958 | Mangin | 13—31 XR |
| 2,942,049 | 6/1960 | Carr et al. | 13—14 XR |

VOLODYMYR Y. MAYEWSKY, Primary Examiner

H. B. GILSON, Assistant Examiner

U.S. Cl. X.R.

13—9